A. M. PIERSON.
STRAINER.
APPLICATION FILED OCT. 22, 1915.

1,191,994. Patented July 25, 1916.

INVENTOR:
Anna M. Pierson,
BY
Dyker Campfield.
ATTORNEYS.

UNITED STATES PATENT OFFICE.

ANNA M. PIERSON, OF NEWARK, NEW JERSEY.

STRAINER.

1,191,994.  Specification of Letters Patent.  Patented July 25, 1916.

Application filed October 22, 1915. Serial No. 57,219.

*To all whom it may concern:*

Be it known that I, ANNA M. PIERSON, a citizen of the United States, and a resident of Newark, county of Essex, and State of New Jersey, have invented certain new and useful Improvements in Strainers, of which the following is a specification.

This invention relates to an improved strainer or screen and is made so that it is held securely in position on different sizes of utensils, resting on the top edge of the utensils and being held by its handles against sliding.

The invention has for its object to form and dispose the handles so that the strainer can be used without the necessity of holding it, leaving both hands free to tilt a vessel, the contents of which are being poured into the strainer, and to use a spoon for agitating the material poured into the strainer.

The invention is particularly adapted for use in straining food stuffs such as jellies, soups and similar materials that are strained by either allowing them to lie in the strainer or by stirring them while they are being poured through the strainer.

Strainers that require holding deprive the user of the use of one hand for anything else, which is particularly annoying when pouring and stirring are done at the same time.

One embodiment of the invention is illustrated in the accompanying drawing, in which—

Figure 1:
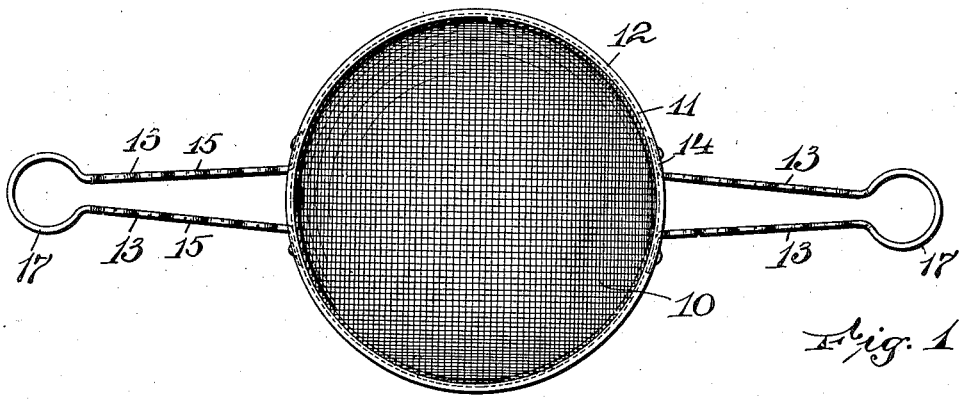
Figure 2:
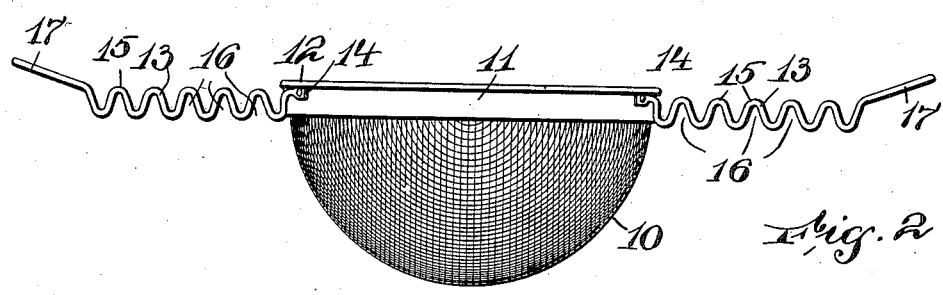

Figure 1 is a top view of the strainer. Fig. 2 is a side view of the device shown in Fig. 1, and Fig. 3 is a top view of a modified form of handle.

Any form of strainer or screen member can be used in this device, but it is customary in these kitchen utensils, for the purpose of making a stable article and one that provides a fairly firm surface for stirring, to form the screen of perforated metal or of wire mesh, the form shown being made of wire mesh as at 10, the screen member 10 having a rim 11 to which the part 10 is secured in any manner. The rim 11 is usually turned over at its top edge as at 12 to stiffen the device so that it retains its shape, the form shown being round, although it will be evident that other forms can be used. To the rim 11 are attached suitable handles, the drawing showing two placed at opposite sides of the screening member, each handle consisting of a pair of corrugated strands 13 which are fastened at their ends 14 to the rim 11, the strands 13 having spaced recesses at the bottom edge, and when wire strands are used the corrugations 15 form the recesses 16 which are provided in any number, these recesses being adapted to receive the top edges of utensils of different sizes. The strands terminate into a loop 17 which can be used as a finger-piece supporting the strainer by hand. These strands 13 are substantially parallel, the form shown illustrating them as slightly converging toward the outer end of the handle, these spaced wires providing supports that prevent the tilting of the strainer and also prevent the sliding of the strainer in any direction, either transversely to or in line with the handles. The handles are approximately arranged radially on the screen or strainer part of the device, and are preferably arranged on the opposite sides thereof, the handles having their strands comparatively close together so as to give a considerable free and unbroken space between the outer edge of the strainer and the edge of the receptacle on which the strainer rests, so that access can be had to the material in the utensil. The recesses 16 are of substantial depth and provide for supporting the strainer either in the center or near one side or one edge of a utensil, as desired.

When the strainer is in position it is securely held against movement and both hands of the person utilizing the strainer can be employed in pouring material into the strainer and stirring it at the same time, or doing any other functions connected therewith that require the use of both hands. The strainer, by means of these handles, can be supported on one side of a utensil by arranging one of the recesses close up to the strainer on one edge of the utensil, and a recess more toward the end of the opposite handle on the other edge of the utensil, thereby giving access to material underneath the strainer when this is desirable or necessary.

Figure 3:
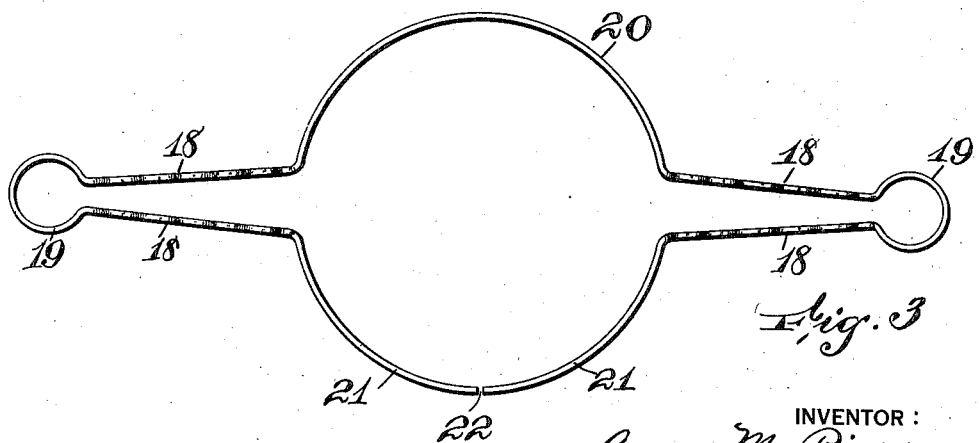

In Fig. 3 I illustrate a form of handle which is made of one piece and is adapted to be either permanently or removably secured on a strainer, this form consisting of the corrugated handle strands 18 which can terminate in any desired manner, being shown as forming finger loops 19, two of the strands on opposite sides being connected by a curved or looped portion 20 which is in one piece with the rest of the structure, and the other two strands 18 are connected by curved parts 21, the ends of these, as at 22, forming the ends of the piece of wire of which the handle and supporting member are made. The split part 22 permits the device to be snapped over and around a suitable strainer, and in this way strainers of different mesh can be utilized with the same handle without providing each different mesh strainer with a handle of its own. When the form shown in Fig. 3 is used the bead 12 resting on the parts 20 and 21 supports the strainer so that it does not pass down through the handle part.

Having thus described my invention, I claim:

1. A strainer comprising a screen, a supporting rim on the screen, and radial wire handles secured to the rim, the handles being formed of substantially parallel strands bent so as to form vertically disposed corrugations of substantial depth.

2. A strainer comprising a screen, radially arranged handles secured to the screen, each handle comprising an end loop to form a holding end, and two strands connecting the loop and the screen, the strands being corrugated alike to form downwardly opening recesses spaced apart and of substantial depth.

3. A strainer comprising a perforated member, and radially arranged handles projecting from opposite sides thereof, and substantially in line, the handles being formed of spaced wires, the wires being secured to the member and terminating in loops, the wires in each handle being corrugated alike to form downwardly opening recesses of substantial depth to receive the top edges of utensils of different sizes.

4. A strainer comprising a screen, handles secured to the screen, the handles being substantially in line and projecting from opposite sides of the screen, the handles each having their side edges formed to provide downwardly opening recesses of substantial depth and having the space between the edges on the same handle open to receive the edge of a curved receptacle.

In testimony that I claim the foregoing, I hereunto set my hand, this 20th day of October, 1915.

ANNA M. PIERSON.